United States Patent [19]

Ivanov et al.

[11] Patent Number: 4,936,549
[45] Date of Patent: Jun. 26, 1990

[54] PULLEY

[76] Inventors: Valery A. Ivanov, prospekt Karla Marxa, 13/15, kv. 29, Dnepropetrovsk; Jury L. Gavryliv, ploschad Osvobozhdenia, 9, kv. 89, Ivano-Frankovsk; Jury D. Petrina, ulitsa Gagarina, 192, kv. 28, Ivano-Frankovsk; Vasily N. Petrina, ulitsa Dadugina, 136G, kv. 36, Ivano-Frankovsk; Anatoly M. Kozlov, ulitsa Kozlova, 5, kv. 37, Minskaya oblast, Soligorsk, all of U.S.S.R.

[21] Appl. No.: 381,049

[22] Filed: Jul. 17, 1989

[30] Foreign Application Priority Data

Jul. 1, 1985 [SU] U.S.S.R. ............................ 3922371

[51] Int. Cl.⁵ ............................................. B66D 1/30
[52] U.S. Cl. ................................... 254/264; 254/371; 254/390; 474/176
[58] Field of Search ............... 474/175, 176, 177, 178, 474/237; 254/264, 374, 371, 390

[56] References Cited

U.S. PATENT DOCUMENTS 3,105,676 10/1963 Brockbank et al. ............ 474/175 X
4,013,142  3/1977 Hagg ............................... 474/175 X
4,571,225  2/1986 Lengerfelder, Jr. ............ 474/177 X

FOREIGN PATENT DOCUMENTS 8774  9/1894 U.S.S.R. ............................ 474/176
707880  1/1980 U.S.S.R. .
783210 11/1980 U.S.S.R. .

Primary Examiner—Katherine A. Matecki

[57] ABSTRACT

A pulley comprises a hub with spokes arranged radially about its circumference. Secured on the spokes is a rim with a rim base accommodating lining inserts having holes wherethrough a flexible link extends to embrace the rim base. At the outside of the pulley each insert has a groove terminating in the hole. The width of the groove is such as to ensure removal of the flexible link from the hole therethrough. Provided at end faces of the inserts concentrically with the holes are recesses receiving ends of precompressed resilient elements disposed between the inserts.

1 Claim, 2 Drawing Sheets

PULLEY

FIELD OF THE INVENTION

This invention relates to hoisting mechanisms, and more particularly to a pulley.

The invention can be used most advantageously in mining, particularly in hoisting machines.

The invention can also find application in pulley blocks of drilling rigs, lifting blocks of excavators, headframe pulleys of blast furnaces, etc.

For extending the service life of widely used rope guiding pulleys use is usually made of replaceable lining fixedly secured at the pulley rims. However, movement of the rope relative to the lining due to slipping or resilient stretching causes accelerated wear of the lining. Replacement of the worn lining fixedly secured to the pulley rim in the known pulley constructions necessitates substantial time expenditures. This is mostly due to the arrangement of separate inserts of the lining in the annular groove of the rim base where they are placed through special mounting ports normally one or two in number. Also, the rope must necessarily be removed from the pulley prior to replacement of the lining. Downtime for lining replacement leads to substantial economic losses.

For example, replacement of worn pulley lining of a mine head-frame results in idling of the hoisting machine and consequently dead time of the mine.

Lined pulleys have been altogether dispensed with in pulley blocks of drilling rigs due to much time consumed for worn lining replacement, because extensive idling of the drilling rig can lead to a breakdown of the drill pipe string. Conversely, unlined pulleys are disadvantageous economically due to short service life of pulleys and hoisting ropes.

In order to extend the working life of rope guiding pulleys and ropes use is made of a range of linings.

BACKGROUND OF THE INVENTION

There is known a pulley construction (cf. SU, A, 707,880) comprising a hub with a rim, the rim base accommodating a movable lining in the form of a closed shaped strip. In the course of operation the rope moves together with the lining relative to the pulley rim, rather than relative to the lining. Therewith, the corrugated surface of the rope virtually fails to wear the lining. The lining is subject to slow wear at the side of the smooth surface of the rim under specific pressures of substantially smaller magnitude than those taking place with the fixed lining caused by ropes in the conventional prior art constructions of rope guiding pulleys.

Arrangement of the movable lining in the form of a shaped strip allows to make a fast replacement of the worn lining without removing the rope from the pulley. This in turn makes way to a wider application of such a movable lining in pulley blocks of drilling rigs. The procedure of removing the worn lining from the pulley rim and fitting a new lining to the rim can be done by a slowly moving rope. The work of the operator in this case resides in detaching the ends of the worn movable lining, placing a new lining under the rope at the rope climbing side, and closing the ends of the new lining into a ring around the rim after the rope pulls the lining into the rim base.

However, high rope stress between the pulley rim and shaped strip causes intensive wear of the lining necessitating stops of hoisting machines for lining replacement.

In order to ensure that the movable lining is more reliable, the shaped strip (cf., SU, A, 783,210) is made of a rubberized band having portions impregnated with epoxy resin at the side of contact between the rope and pulley rim and alternating non-impregnated portions.

However, this movable lining in the form of a rubberized band embracing the pulley about the rim circumference is subject to tensile stresses caused by centrifugal forces outside the arc of contact between the pulley and rope and tensile stresses arising due to forces of friction caused by resilient stretching of the rope at the arc of contact. The later forces can be substantial due to high cohesion between the lining and ropes, whereby the lining repeats oscillating motions of the rope in the course of resilient stretching of an amplitude 0.5 to 3 mm. Tensile stresses in the rope and deformations associated therewith can reach critical magnitudes for the lining to result in inadmissibly high residual deformations. The residual deformation gradually builds up to an extent causing escape of the lining from under the rope and failure.

The lining, as well as the rope, is stationary relative to peripheral sections of the arc of contact, although it has a tendency to move at the points where it climbs and runs off the pulley. In consequence, one portion of the lining is clamped, whereas the other two oscillate together with the rope alternately elongating and contracting thereby experiencing tensile stresses especially dangerous as the cross section of the movable lining is reduced due to wear. Therewith, the sign-variable oscillating character of stresses caused by resilient stretching of the rope can give rise to fatigue in the lining, again hazardous as its cross section is reduced in the course of wear.

Therefore, low reliability of the movable lining in this known pulley is caused by that this prior art construction is incapable of reliably performing two major functions, viz., prevent the rope and pulley rim from wear and act as a carrying element holding the lining in the pulley rim.

There is also known a lining in which lining inserts are freely placed onto a flexible link, clearances between the inserts accommodating prestressed resilient elements embracing with a clearance the flexible link (cf., SU, A, 1,081,949).

However, these inserts fail in the course of prolonged operation due to alternating dynamic loads. Replacement of the lining inserts requires removal of the movable lining from the pulley which is time consuming and leads to idling of hoisting machines in mines.

SUMMARY OF THE INVENTION

It is an object of the present invention to extend the service life of pulleys and hoisting ropes.

Another object is to reduce the time consumed for replacing worn out lining inserts.

The objects of the invention are attained by that in a pulley comprising a hub with spokes radially secured about its circumference, a rim secured on the spokes, a rim base having lining inserts arranged with a clearance therebetween, conforming to the shape of the rim base and provided with holes for a flexible link to extend through these holes and embrace the rim base, and precompressed resilient elements positioned between the inserts and embracing the flexible link, according to the invention, end faces of the inserts have recesses concentric with the through holes, these recesses receiving ends of the resilient elements, each insert having outside of the pulley a groove extending into the through hole, the width of this groove being such as to ensure removal therethrough of the flexible link from the through hole.

The invention allows to extend the service life of a pulley and thereby make hoisting machines operate more efficiently. In addition, the resilient elements received in recesses of the shaped inserts act to retain in the pulley rim fragments of damaged inserts in case of their failure, whereby such capacity to hold the damaged inserts and to have them operatively replaced ensures a longer life of the lining.

BRIEF DESCRIPTION OF THE DRAWINGS

Other objects and attending advantages of the invention will become more fully apparent from a more detailed description of a preferred embodiment thereof taken in conjunction with the accompanying drawings, in which.

DETAILED DESCRIPTION OF THE INVENTION

Figure 1:
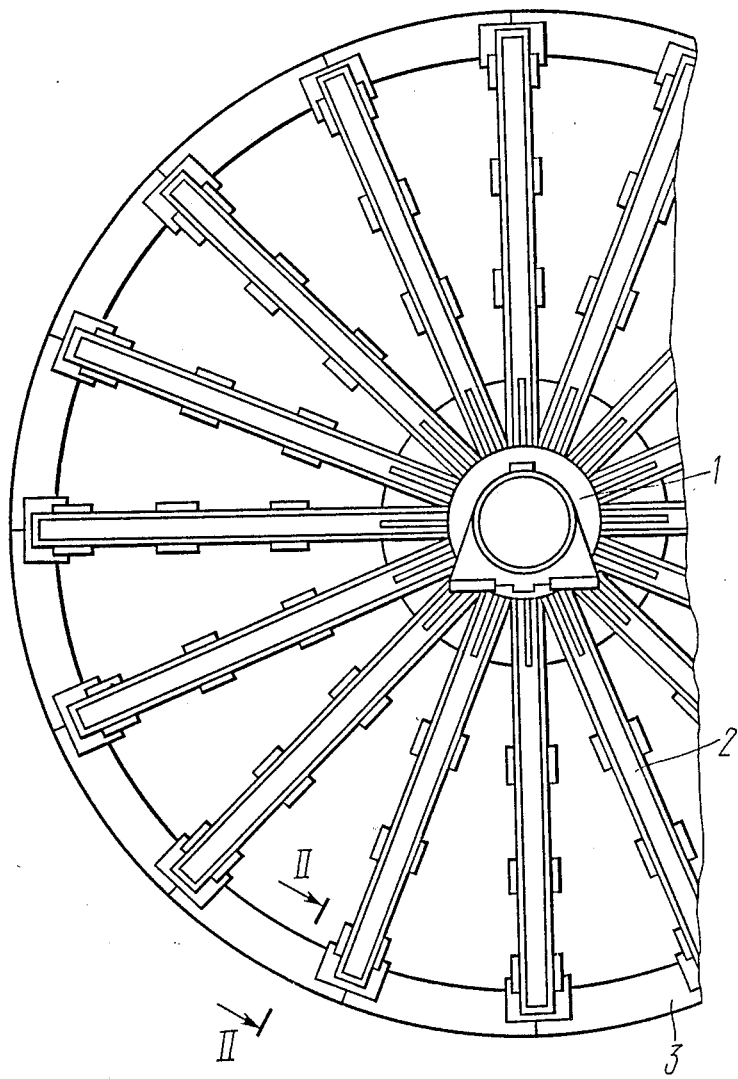
FIG. 1 is a general view of a pulley according to the invention.

The proposed pulley comprises a hub 1 (FIG. 1) with spokes 2 affixed radially about the circumference of the hub 1. Secured at the spokes 2 is a rim 3, the rim base accommodating a movable lining conforming to its cross sectional configuration, extending about the rim circumference, closed about the rim 3, and fitting closely to the rim bottom about an arc of contact.

Figure 3:
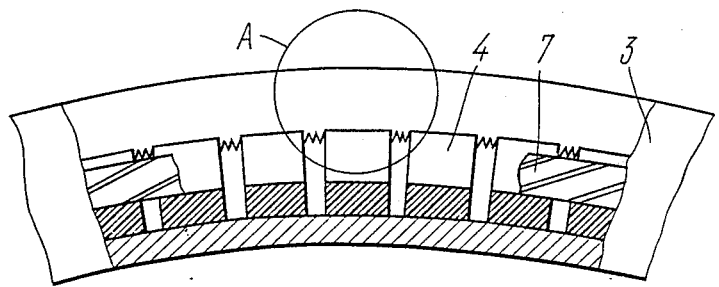
FIG. 3 is a section taken along the line III—III in FIG. 2.
Figure 2:
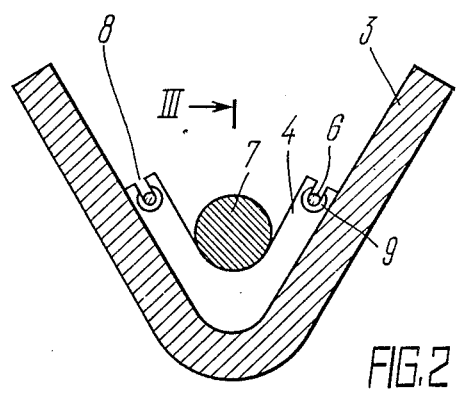
FIG. 2 is a section taken along the line II—II in FIG. 1.
Figure 4:
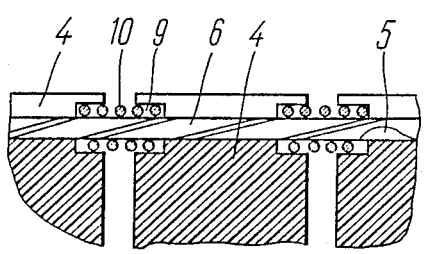
FIG. 4 shows section A in FIG. 3.

The movable lining is made up of lining inserts 4 (FIGS. 2 to 4) V-shaped in cross section and having each at the ends symmetrical through holes 5 with a flexible link element 6 threaded therethrough to embrace the base of the rim 3. The flexible link element 6 has the form of two cables closed into a ring. The through holes 5 are outside the working zone of the insert 4 contacting with a hoisting rope 7 which embraces the pulley. Each insert 4 has at the outside of the pulley grooves 8 terminating in the through holes 5. The groove 8 has a width enabling evacuation of the flexible link element 6 therethrough from the hole 5.

Provided at the end faces of the inserts 4 concentrically with the holes 5 are recesses 9 accommodating resilient elements 10, such as compression springs, embracing the flexible link 6.

The pulley has a means (not shown) for tensioning the flexible links 6 used to compensate for stretching of the flexible link 6 in operation of the pulley, and to loosen the flexible link 6 when replacing the faulty inserts 4.

Operation of the pulley leads to wear of the movable lining at surfaces contacting with the hoisting rope 7 and rim 3 of the pulley. Wear of the lining surface contacting the rim 3 at invariable length of the flexible link 6 leads to a clearance between the rim 3 of the pulley and shaped inserts 4 outside the arc of contact between the pulley and rope 7. As a result, the movable lining tends to sag at the lower part of the pulley. As the lining moves relative to the pulley, the lining inserts 4 subjected to the action of centrifugal forces and vibration loads can turn to assume incorrect position in the rim 3. The inserts 4 incorrectly positioned in the rim 3 of the pulley can be damaged by the hoisting rope 7. The recesses 9 receiving the ends of the resilient elements 10 serve to prevent the insert 4 from turning.

The faulty insert 4 is replaced in the following sequence. The skip of the hoisting mechanism is lowered 30 to 40 meters below the zero mark. This is necessary for slackening the rope 7. The rope 7 is hoisted by any known suitable means to the level of the rim flange of the pulley. The flexible link 7 is also slackened by the tension mechanism. After this the damage insert 4 is removed to be replaced by a new insert. The inserts to be replaced are brought out of the zone of contact with the hoisting rope 7. After replacing the faulty inserts 4 the flexible link 6 is tightened, correct position of the inserts 4 in the base of the rim 3 of the pulley is checked, the rope 7 is placed on the bearing surface of the inserts 4, and the hoisting machine is actuated.

What is claimed is:

1. A pulley comprising:
   a hub;
   spokes secured radially about the circumference of said hub;
   a rim secured on said spokes and having a base portion;
   a plurality of lining inserts arranged with clearances therebetween around said rim base portion, said lining inserts comprising through holes and end faces between which said clearances are provided;
   a flexible link extending through said through holes and circumferentially embracing said rim;
   a groove provided in each said insert terminating in said through hole;
   recesses in the end faces of the inserts concentric with said through holes;
   the width of each said groove being such as to ensure that said flexible link can be removed therethrough from said through hole;
   a plurality of compressed resilient elements provided between said inserts and surrounding said flexible link, the resilient elements each having ends received in the recesses in the end faces of adjacent lining inserts.

* * * * *